United States Patent Office 2,945,581
Patented July 19, 1960

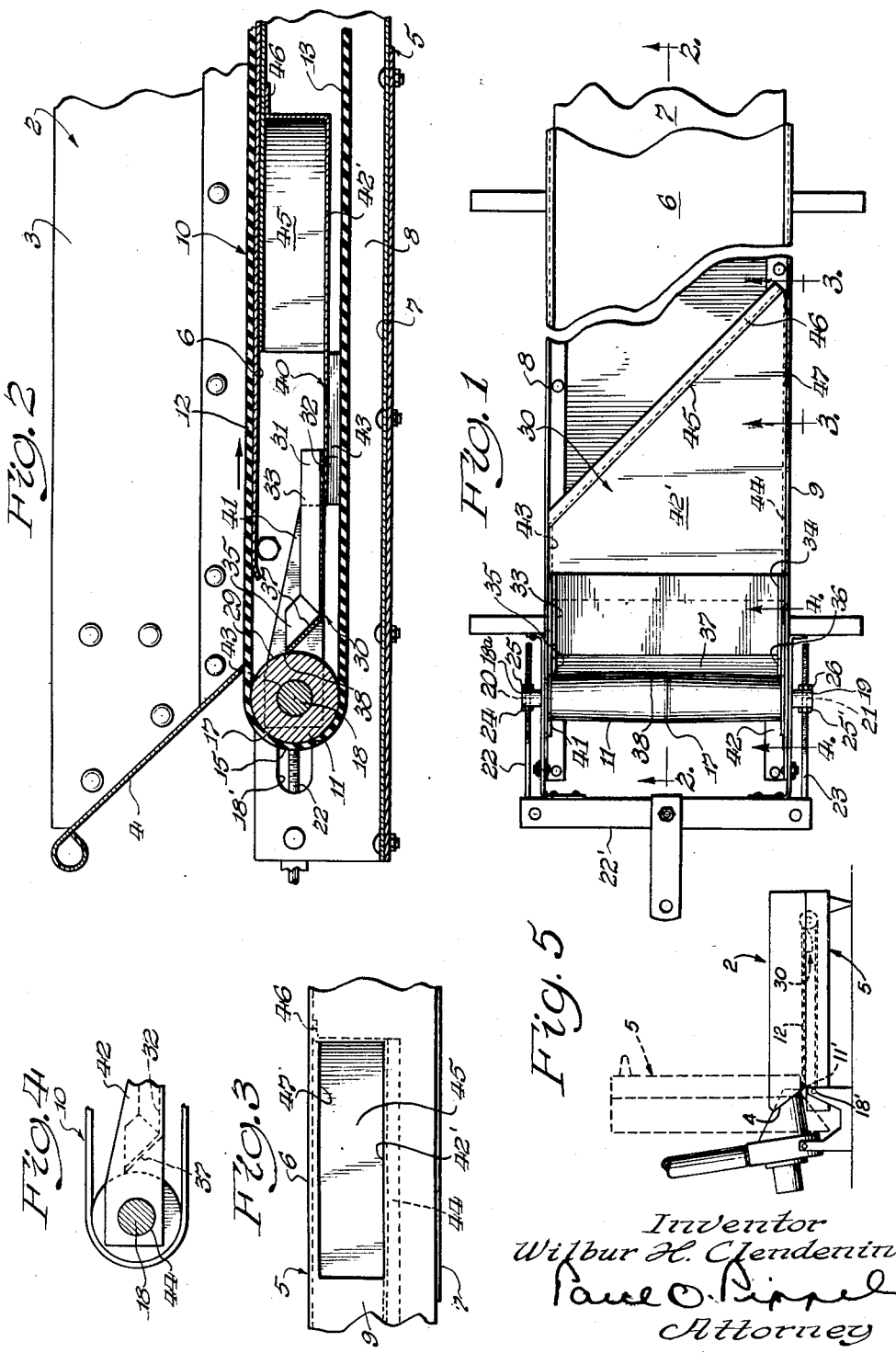

2,945,581

ROLL CLEANER FOR BELT CONVEYORS

Wilbur H. Clendenin, Downers Grove, Ill., assignor to International Harvester Company, Chicago, Ill., a corporation of New Jersey Filed Apr. 5, 1957, Ser. No. 650,879

5 Claims. (Cl. 198—229)

This invention relates to conveying devices and more particularly to belt type conveyors.

In forage blowers and the like there is provided a crop receiving trough in which is disposed an apron for feeding the crops to the blower. In such applications the trough portion is hinged with respect to the blower portion in order to accommodate positioning the wagon for discharge thereinto as will readily be understood by those skilled in the art. The problem in the use of a smooth belt type apron has been in maintaining the rollers, upon which the apron is mounted, relatively clean from adherent forage and different packy particles which tend to build up about the roller until the accumulations increase the size of the roller and break the belt or wedge the belt against the surrounding trough parts.

A general object of the invention is to provide a novel scraper unit for maintaining the roll clean of these adherent particles.

A more specific object of the invention is to provide in a forage blower a novel scraper assembly which comprises a scraper blade adapted to cooperate with the periphery on the roll and the blade being associated with a receiving pan, the latter having a guide surface which is angled laterally toward one side of the blower for discharging the accumulations through an opening therein.

The invention contemplates the arrangement above described wherein the diagonal end wall of the receiving pan is so arranged that it extends diagonally downwardly outwardly to the opening in order to facilitate discharging of the material as the conveyor trough is periodically raised to position the trough to clear the wagon from which the material is to be dumped into the conveyor.

These and other objects will become more apparent from the specification and the drawings, wherein:

Figure 1 is a fragmentary broken apart plan view of a blower hopper construction incorporating the invention;

Figure 2 is a longitudinal sectional view taken substantially on the line 2—2 of Figure 1 on an enlarged scale;

Figure 3 is a side elevational view taken substantially on the line 3—3 of Figure 1;

Figure 4 is a sectional view taken substantially on the line 4—4 of Figure 1; and Figure 5 is a side elevational view of a blower-conveyor combination incorporating the invention.

Describing the invention in detail and having particular reference to the drawings, there is shown a conventional hopper or conveyor trough generally designated 2 which has a side 3 at each side and an outer end wall 4 interconnecting the sides 3, the sides 3 and 4 being carried by a substantially box section foundation structure or housing generally indicated 5 which comprises vertically spaced top and bottom walls 6 and 7 and laterally spaced side walls 8 and 9. A belt 10 is carried by the foundation structure 5 by means of rollers 11 and 11' at each end, the roller 11 herein illustrated being located at the outer end of the conveyor, the belt or apron having its top run 12 operating in the direction of the arrow over the top wall 6 of the structure 5 and the return or bottom run 13 disposed between the top and bottom walls 6 and 7. The roll 11 is crowned or tapered toward each end and the belt loop 15, as best seen in Figure 2, is wrapped about the external semicircular portion 17 of its periphery. The roll 11 is mounted on a shaft 18 which at each end extends through longitudinally elongated slots 18' in panels 8 and 9 and the end portions of the roll outwardly of the side panels 8 and 9 are drilled at 20 and 21 and receive the adjusting bolts 22 and 23 therethrough, the bolt 22 having nuts 24 and 25 threaded thereon at opposite sides of the end portion 18a and the bolt 23 having the adjusting and locking bolts 25' and 26 threaded thereon at opposite sides of the end portion 19 of the shaft. The bolts 22 and 23 are mounted on a crosspiece 22' connected to the panels 8 and 9 outwardly of the adjacent end of the trough. It will be seen that by unthreading the nuts 24 and 25 the roll is free to be moved in a direction tightening the belt and such adjustment is accomplished by tightening the nuts 25 and 26 and when a desired position is obtained then the nuts 24 and 25 are tightened against their respective end portions to lock the shaft in its adjusted position. It will be seen that the roll 11 journals on the shaft 18 and is not power driven, however, the invention hereinafter described is equally applicable to a power driven as well as to idler roll.

The inner semi-circular portion 29 of the periphery of the roll is disposed between the top and bottom runs 12 and 13 of the belt and within this space there is located a roll cleaning device generally designated 30. The device 30 comprises generally a horizontal pan portion 31 which has a bottom wall 32 and at its lateral edges is turned upwardly to provide flanges 33 and 34. The flanges 33 and 34 serve as lateral sides for the tray and extend along the inner sides of the side walls 8 and 9 of the box section foundation structure. The flanges 33 and 34 are continued diagonally upwardly at 35 and 36 and serve as reinforcements and material confining means for a transverse blade 37 which has a leading edge 38 contoured to the crowned periphery of the roll 11 for scraping accumulations thereon. The blade extends downwardly inwardly and leads into the adjacent edge of the bottom panel 32 of the tray which at its far extremity with respect to the roll overlaps and is slidingly supported on a tray extension generally designated 40 in order to accommodate movement of the roll cleaning device 30 with the roll, said device being carried at opposite sides by the straps 41 and 42 which are journaled as at 43 and 44 on the shaft 18, the straps or arms 41 and 42 flanking the cleaning device 30 and being weld-connected, preferably, to the flanges 31, 35 and 34, 36 respectively and in guided abutment with the walls 8 and 9 of the confining housing.

The portion or supporting means 40 of the tray structure comprises a bottom wall 42' which extends inwardly with respect to the tray and knife device 30 and at its opposite lateral extremities is flanged as at 43 and 44 and is secured to the side walls 8 and 9, respectively, as by welding. The far extremity of the tray 40 is provided with an upright wall 45 which is angled diagonally transversely of the hopper or trough and along its upper edge is flanged as at 46 and secured to the top plate 6 as by welding. It will be seen that the diagonal or the inclination of the wall 45 is adapted to gravitate the material which accumulates on the pan portion 31 and in the pan portion 40 when the trough is in its normal horizontal operating position so that when the trough is raised as shown in U.S. Patent No. 1,294,397 and in Figure 5 in phantom lines by pivoting about shaft 18' of roller 11', the material will gravitate to the wall 45 and at the same time will slide laterally along the inclined surface through the opening 47 which is disposed in alignment with the tray 40 transversely of the hopper, the opening 47 being developed in the side wall 9.

It will be seen that the roll cleaning device is movable and is disposed in operative relation with the roll as the roll is being adjusted by means of the adjustment means 22, 23 to tighten the belt. The fact that the cleaning device 30 is swingable on the roll shaft 18 facilitates movement and gravitation of the material which is being scraped off the roll as the machine vibrates in operation.

Thus it will be noted that a novel, simple and efficient roll cleaning device has been developed which is adapted to discharge through the side of the conveyor structure.

What is claimed is:

1. In a blower of the type comprising a trough pivotally mounted at one end for vertical swinging movement and having a foundation structure, roller means, a shaft mounting said roller means on said structure, a belt supported on said roller means and having top and bottom runs, and means for cleaning said roller means comprising a pair of arms swingably mounted on the shaft at opposite ends of said roller means, a scraper blade and tray assembly supported on said arms between said runs and including a scraper blade portion having an edge disposed against the periphery of said roller means and extending tangentially downwardly and outwardly of the roller means, a tray portion connected to said blade portion and extending horizontally away from said blade portion, and an extension tray mounted on said structure and having a bottom wall underposed with respect to said tray and having a far wall with respect thereto diagonally disposed with respect to the longitudinal center line of said conveyor and extending transversely of said runs and having a trailing end disposed to discharge material through an opening in an adjacent side of the structure.

2. In a blower of the type described having a housing, a roller having a shaft mounted thereon, and a belt trained on the roller and having spaced runs, a roller cleaning device comprising a pair of arms swingably mounted concentric with the roller on the shaft at opposite ends of said roller, a tray and blade assembly carried between the arms at one side of the roller and including a blade having one edge in contact with the periphery of the roller and inclined away therefrom, and a tray extending outwardly from the far edge of said blade with respect to said roller, and support means on the housing seating the opposite end of the tray.

3. In a blower, a conveyor comprising a housing, a trough thereupon, a roller having a shaft adjustably and transversely mounted upon the housing for adjustment lengthwise thereof, means pivotally mounting said housing remote from the roller for vertical swinging movement between generally horizontal and upright positions, a belt looped about the roller and having top and bottom runs, and a roller cleaning device mounted on said shaft and extending between said runs and having a blade with a leading edge in contact with the periphery of the roller and extending outwardly tangentially of the roller and having a trailing edge, a tray extending outwardly of the roller from said trailing edge, a tray extension fixedly mounted on the housing and disposed in telescoping relation with said tray, said tray movable with respect to said tray-extension transversely thereof, said tray extension having a wall in the path of material moving away from said roller angled in a vertical plane laterally of the trough and leading to an opening in a side of the housing for sliding material out of the tray through the opening pursuant to the raising of said conveyor to upright position.

4. In a blower of the type described having a longitudinal trough hinged at one end to an associated blower structure for vertical swinging movement between horizontal and vertical positions and having a belt conveyor in the trough mounted upon a pair of rollers extending transversely of the trough and support structure beneath the trough mounting said rollers, the improvement comprising a roller cleaning and material disposing device including arm means swingably supported on the axis of rotation of a roller, a blade and tray device carried by the arm means contiguous to said roller and having an edge in scraping relation to the roller and extending outwardly therefrom within the belt and said device having one portion swingable with the arm means about the axis of the roller and said device having another portion mounted on the trough and supporting said one portion in material-receiving relation to the roller, said tray having a wall remote from said roller inclined to the axis thereof and leading to an opening in a side of the structure for dumping material accumulating in the tray upon said trough and support structure being swung upwardly with attendant swinging movement of said portion of the device for vibrating material onto said wall.

5. The combination of a roller having a peripheral belt-supporting surface, a shaft journaling the roller, a pair of arms pivoted on the shaft, and a scraper blade and tray device having a portion secured to said arms and having an edge in scraping contact with said periphery, and flanges at opposite ends of the blade upstanding therefrom for confining the material on the blade, said device having a supported portion disposed in supporting relation to the first mentioned portion for positioning the same in material-receiving relation to the roller and itself providing a material-receiving and discharging guide surface for deflecting material deposited thereon.

References Cited in the file of this patent

UNITED STATES PATENTS

| | | |
|---|---|---|
| 1,294,397 | Carson | Feb. 18, 1919 |
| 1,729,322 | Barber | Sept. 24, 1929 |
| 1,779,686 | Alver | Oct. 28, 1930 |
| 1,871,503 | Duesberg | Aug. 16, 1932 |
| 2,288,159 | Ernst | June 30, 1942 |